(12) United States Patent
Crowley et al.

(10) Patent No.: US 6,641,723 B2
(45) Date of Patent: Nov. 4, 2003

(54) OXYGENATED WATER DISPENSING SYSTEM AND METHOD

(75) Inventors: Dennis E. Crowley, Adams, NY (US); Jason K. Ritton, Schenevus, NY (US)

(73) Assignee: Oxygen8, Inc., Jamaica, NY (US)

( * ) Notice: Subject to any disclaimer, the term of this patent is extended or adjusted under 35 U.S.C. 154(b) by 8 days.

(21) Appl. No.: 09/866,237

(22) Filed: May 25, 2001

(65) Prior Publication Data

US 2002/0175127 A1 Nov. 28, 2002

(51) Int. Cl.[7] .................................................. C02F 1/00
(52) U.S. Cl. ................... 210/198.1; 222/146.6
(58) Field of Search ...................... 222/52, 56, 146.6, 222/190; 210/198.1

(56) References Cited

U.S. PATENT DOCUMENTS 4,967,932 A * 11/1990 Wiley et al.
6,234,354 B1 * 5/2001 Phillips et al.
6,273,295 B1 * 8/2001 Quartarone et al.

* cited by examiner

*Primary Examiner*—Betsey Morrison Hoey
(74) *Attorney, Agent, or Firm*—Schmeiser, Olsen & Watts

(57) ABSTRACT

An oxygenated water dispensing system and method of operating the same for dispensing oxygen enriched water from at least one water source. Upon insertion of a payment into a payment acceptor system, a portion of oxygenated water is dispensed. In a second embodiment, a water source, either pressurized or non-pressurized in operatively attached to a soda fountain for dispensing water having an enhanced oxygen content.

27 Claims, 5 Drawing Sheets

OXYGENATED WATER DISPENSING SYSTEM AND METHOD

BACKGROUND OF THE INVENTION

1. Field of the Invention

The present invention relates to the art of dispensing fluids such as drinking water, and more particularly to a dispensing system and method for dispensing oxygen enriched water.

2. Description of Related Art

Oxygen enriched drinking water has an enhanced taste appeal and offers the health and fitness conscious consumer an alternative and supplemental source of oxygen that is absorbed through the stomach. The term drinking water is intended to include, without limitation, spring water, filtered water, or water treated by the reverse osmosis process.

The dissolved oxygen content of natural pure spring water ranges from between about 5 mg/liter to 9 mg/liter depending on the source of the water, purification and processing techniques applied prior to bottling, and other factors.

However, no system has been adequately disclosed for providing oxygenated water on a mass scale for consumer consumption.

SUMMARY OF THE INVENTION

It is desirable to provide a water dispensing system for dispensing oxygen enriched water on a mass scale for consumer consumption. The term supersaturated is defined as a concentration of dissolved oxygen above the maximum that will occur naturally given a specific water temperature and atmospheric pressure. The saturated concentrations for oxygen dissolved in water over a range of temperatures and pressures are given in U.S. Pat. No. 5,747,079 which is hereby incorporated by reference.

The present invention provides a new and improved water dispensing system and method of operating the same for dispensing oxygen enriched water having a dissolved oxygen content at a supersaturated level.

The oxygen source may include an oxygen generator, and such generator may include a pressure swing adsorption oxygen generating apparatus. Alternatively, the oxygen source can be of various other forms including stored oxygen such as bottled oxygen.

In one embodiment of the present invention an oxygenated water system comprises: at least one water source; a soda dispensing system for dispensing water from the at least one water source, wherein water dispensed from the soda dispensing system has dissolved oxygen at a supersaturated level.

Another embodiment of the present invention provides an oxygenated water system comprising: at least one water source; a payment acceptor system, operatively attached to said water source; and a dispensing system, operatively attached to the payment acceptor system, for dispensing water from the at least one water source, wherein water dispensed from the dispensing system has dissolved oxygen at a supersaturated level.

Another embodiment of the present invention provides a method comprising: providing a water source; inserting a payment into a payment acceptor system, operatively attached to the water source; and dispensing water from the at least one water source, wherein water dispensed from the dispensing system has dissolved oxygen at a supersaturated level.

BRIEF DESCRIPTION OF THE INVENTION

The foregoing and additional brief description of the invention features of the present invention will become clearly apparent upon a reading of the ensuing detailed description together with the included drawings wherein.

DETAILED DESCRIPTION OF THE INVENTION

Figure 1:
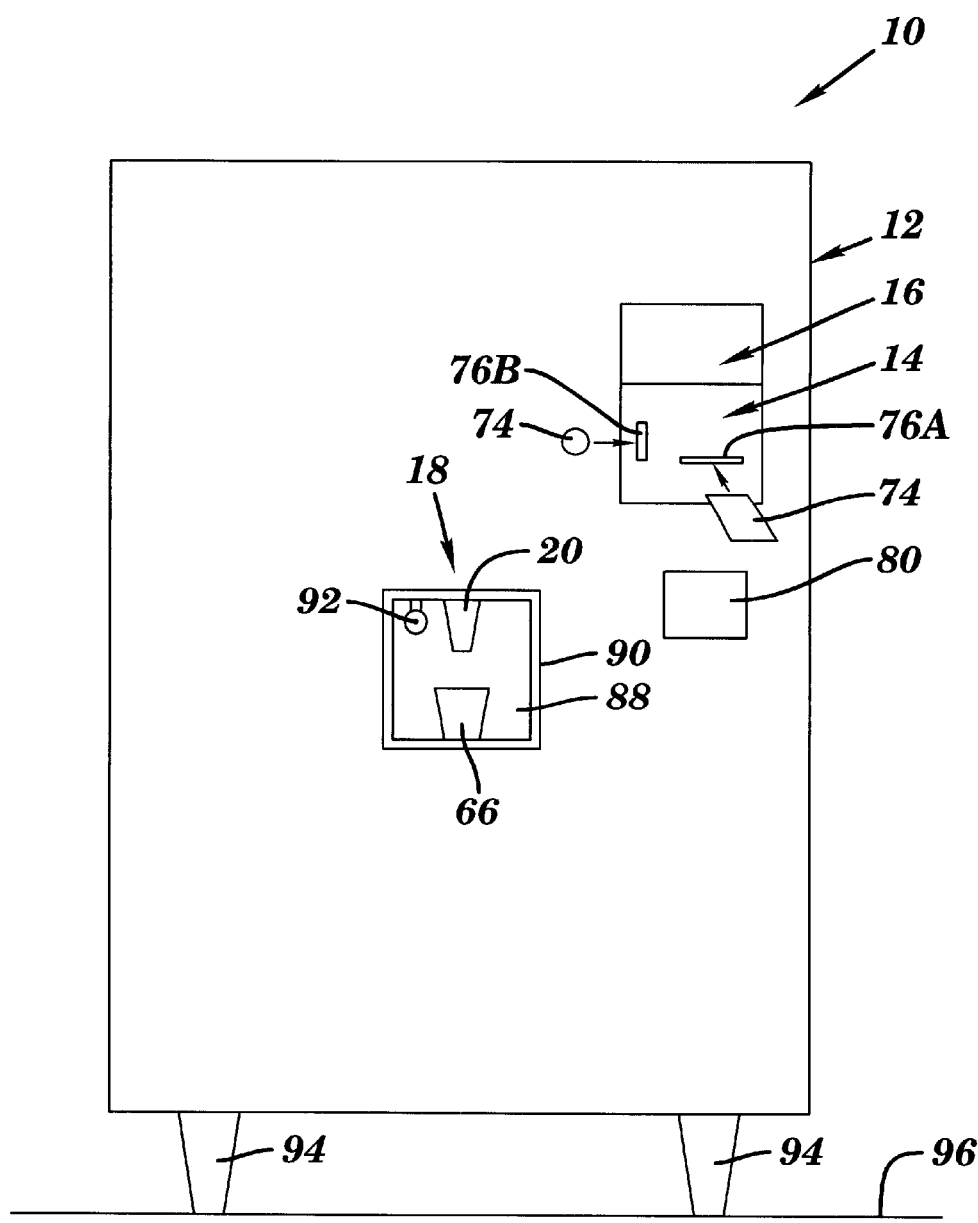
FIG. 1 illustrates a front perspective view of an oxygenated water vending system.

Although certain embodiments of the present invention will be shown and described in detail, it should be understood that various changes and modifications may be made without departing from the scope of the appended claims. The scope of the present invention will in no way be limited to the number of constituting components, the materials thereof, the shapes thereof, the relative arrangement thereof, etc., which are disclosed simply as an example of the present invention. The features of the present invention are illustrated in detail in the accompanying drawings, wherein like reference numerals refer to like elements throughout the drawings. Although the drawings are intended to illustrate the present invention, the drawings are not necessarily drawn to scale.

Figure 2:
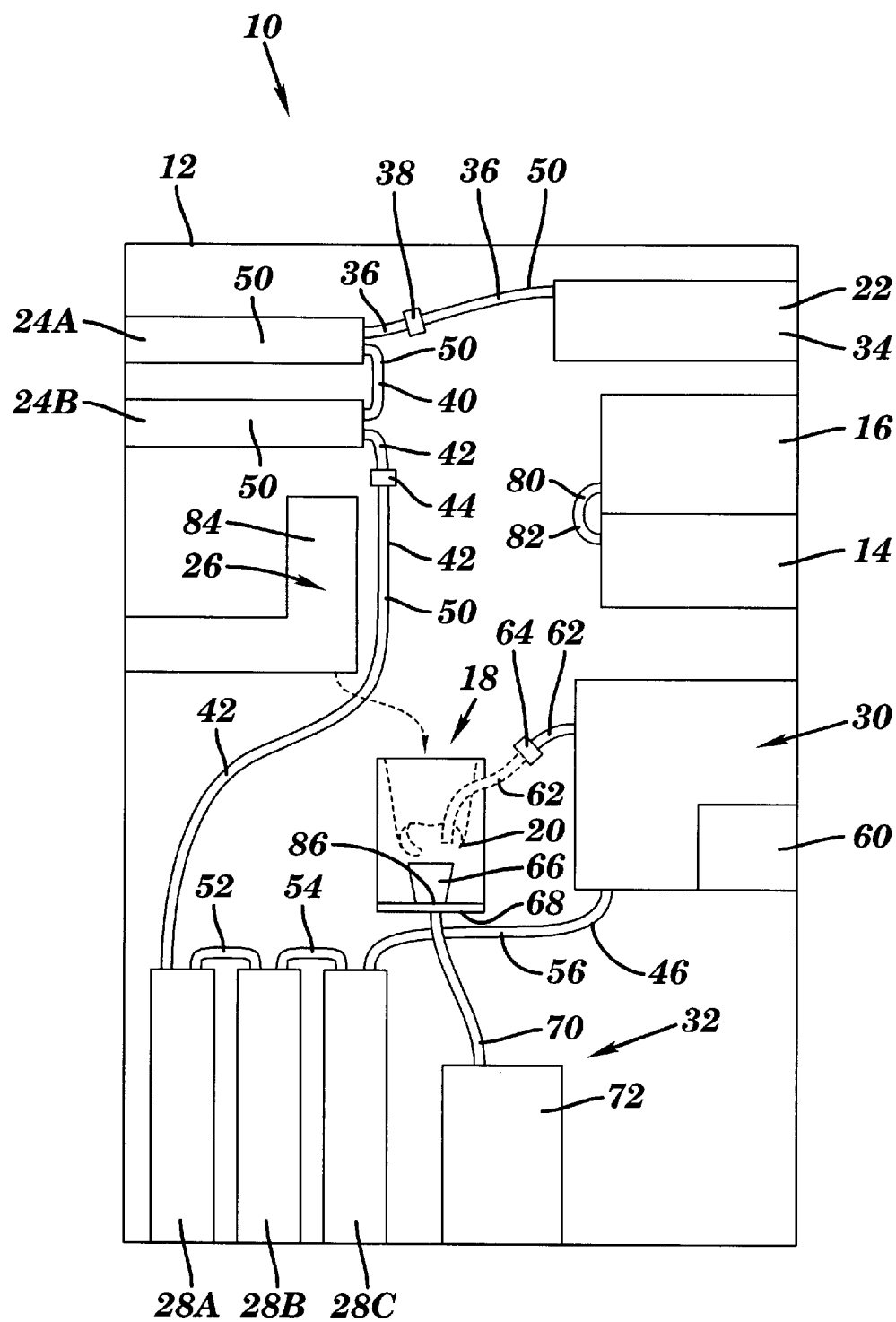
FIG. 2 illustrates a schematic view of a plurality of systems included within the oxygenated water vending system.

FIGS. 1 and 2 illustrates an oxygenated water vending system 10. The oxygenated water vending system 10 includes a housing 12, a payment acceptor system 14, a water control system 16, a dispensing system 18, a spigot 20, an oxygen generator 22, at least one pressurized oxygen tank 24A, 24B, a vessel dispenser system 26, at least one pressurized container 28A, 28B, 28C, a cooling system 30, and an overflow drain system 32.

The oxygen generator 22 provides oxygen 50 to the oxygen tanks 24A and 24B. The oxygen generator 22 may include a pressure swing adsorption apparatus 34 for generating oxygen. One oxygen generator that may be used is a molecular sieve generator as more fully described in U.S. Pat. No. 5,928,610 which is hereby incorporated by reference. A conduit 36 carries oxygen 50 from the oxygen generator 22, through the check valve 38 and into the oxygen tank 24A. The check valve 38 allows oxygen 50 to flow from the oxygen generator 22 to the oxygen tank 24A and prevents oxygen 50 from flowing from the oxygen tank 24A to the oxygen generator 22. The oxygen tanks 24A and 24B store pressurized oxygen 50. The oxygen tanks 24A and 24B are interconnected with a conduit 40. A conduit 42 carries pressurized oxygen 50 from the oxygen tank 24B, through the valve 44 and into the pressurized container 28A. The water control system 16 opens and closes the valve 44 to regulate the supply of pressurized oxygen 50 to the pressurized containers 28A, 28B, and 28C. In an alternate embodiment, the oxygen generator 22 is eliminated and oxygen tanks 24A and 24B supply pressurized oxygen 50 to the pressurized containers 28A, 28B, and 28C.

Figure 3:
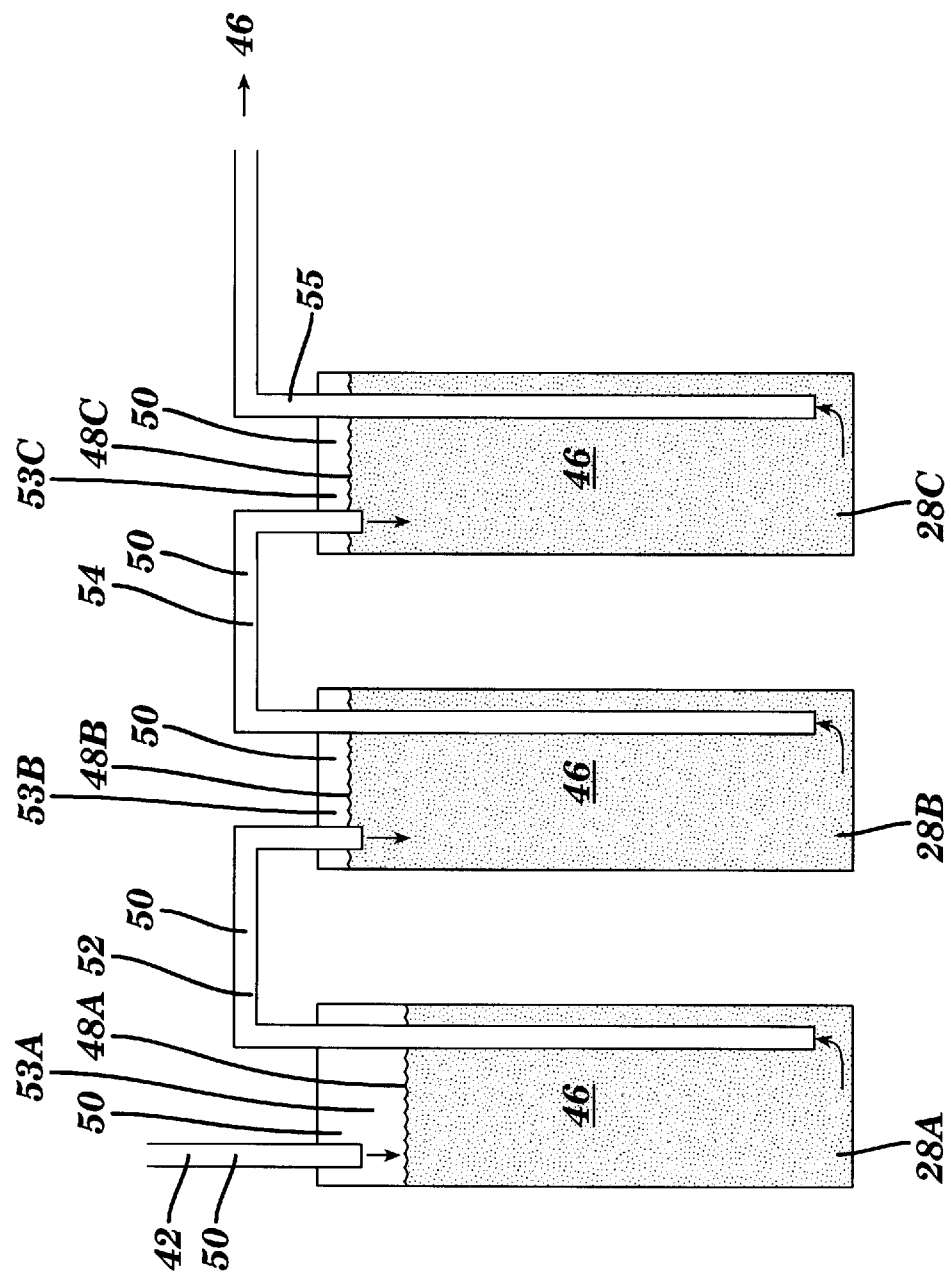
FIG. 3 illustrates a cross-sectional view of a plurality of interconnected pressurized containers.
Figure 4:
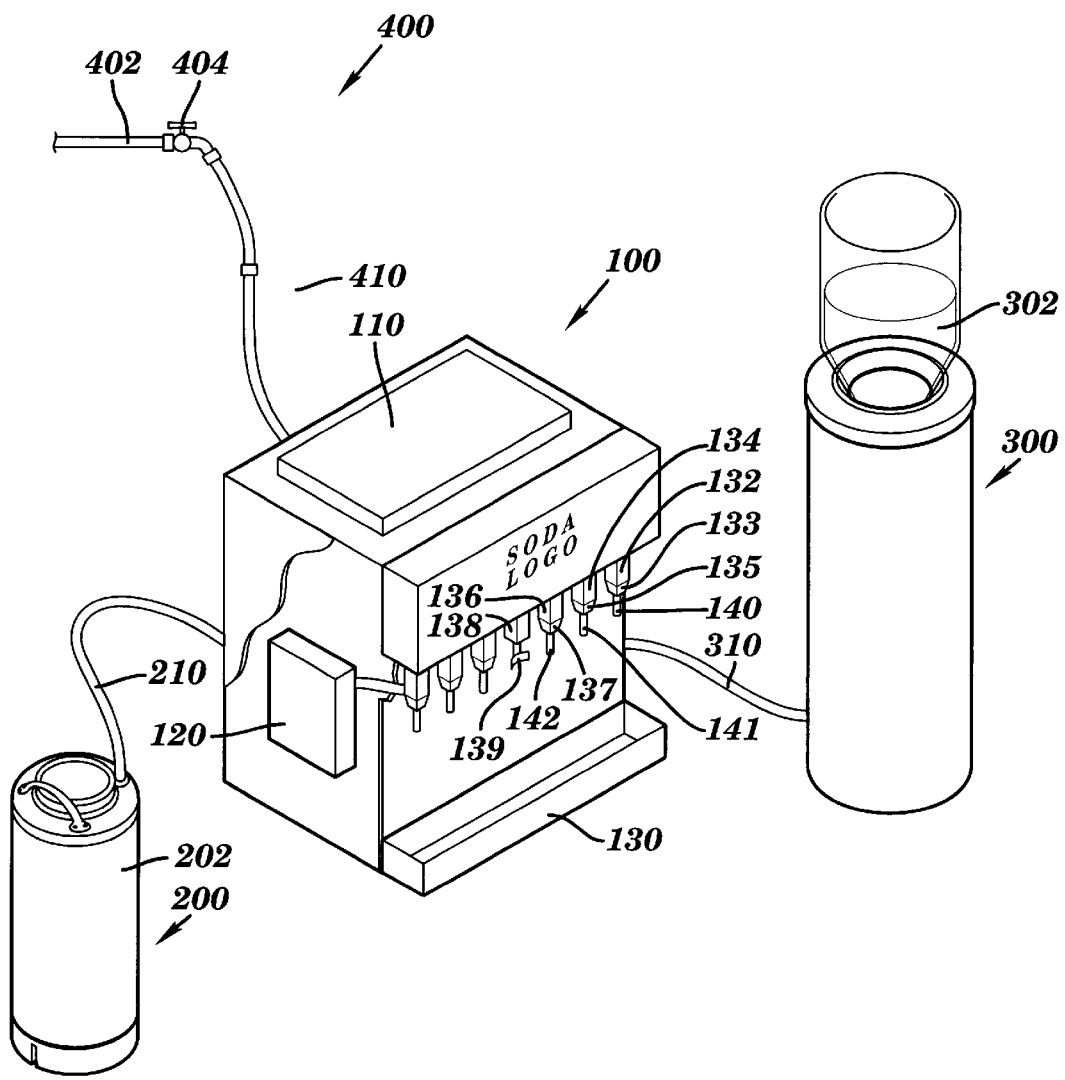
FIG. 4 illustrates a front perspective view of a soda fountain for dispensing oxygenated water.

FIG. 3 illustrates the interconnection of the pressurized containers 28A, 28B, and 28C. Oxygenated water 46 is illustrated in each pressurized container 28A, 28B, and 28C with water levels 48A, 48B, and 48C, respectively. Pressurized oxygen 50 enters the pressurized container 28A through the conduit 42. Oxygenated water 46 and pressurized oxygen 50 may flow through conduit 52 from the pressurized container 28A to the pressurized container 28B. Oxygenated water 46 and pressurized oxygen 50 may flow through conduit 54 from the pressurized container 28B to the pressurized container 28C. Oxygenated water 46 flows out of the pressurized container 28C through a conduit 56. Optionally, a water source, such as 300 and 400, as illustrated in FIG. 4 may be used to provide water in either a non-oxygenated or oxygenated manner. The oxygenated water vending system 10 according to the present invention maintains a headspace 58A, 58B, 58C in each pressurized container 28A, 28B, 28C, respectively, at about 80–95% pure oxygen. Each pressurized container 28A, 28B, 28C is typically a five gallon container, but three gallon or smaller size containers can be employed. The purpose of the oxygen rich headspaces 58A, 58B, 58C are to maintain the dissolved oxygen concentration of the bottled water at about 25–125 mg/liter. The water 50 in the pressurized containers 28A, 28B, 28C has previously has been supersaturated with oxygen at a water purification and bottling plant or other source immediately prior to filling into the pressurized containers 28A, 28B, and 28C. Pressure in the pressurized containers may be about 60 psig.

As illustrated in FIG. 2, the oxygenated water 46 flows from the pressurized container 28C to the cooling system 30 through the conduit 56. The cooling system 30 may include any suitable refrigeration system (e.g., compressor 60, condenser, cooling coil, a thermoelectric device, etc.). The cooling system 30 cools the oxygenated water 46.

The cooled oxygenated water 46 flows from the cooling system 30 to the dispensing system 18 through a conduit 62 (FIG. 2). A control valve 64 turns on or off the flow of oxygenated water 46 from the cooling system to the dispensing system 18. The control valve 64 is controlled by the water control system 16. The dispensing system 18 includes the spigot 20 through which oxygenated water 46 leaves the dispensing system 18. From the spigot 20 the oxygenated water 46 flows into a vessel 66. The vessel 66 may be any suitable container (e.g., cup, can, bottle, etc.). Any oxygenated water 46 that does not flow into the vessel 66 is collected by the overflow drain system 32. The overflow drain system 32 includes a collection tray 68, a drain tube 70, and a storage container 72 or directly into a drain 73. The oxygenated water 46 that does not flow into the vessel 66 is collected in the collection tray 68 and flows through the drain tube 70 to the storage container 72 (FIG. 2).

As illustrated in FIG. 1, the payment acceptor system 14 may receive payment 74 from a user in any suitable means (e.g., a coin, a bill, a token, a credit card, a debit card, etc.). Payment 74 may be inserted into at least one slot 76A, 76B in the payment acceptor system 14. Change for overpayment may be returned through a return chamber 80 of the payment acceptor system 14. Upon receipt of payment 74, the payment acceptor system 14 sends an activation signal 80 to the water control system 16 through conduit 82 (FIG. 2). The water control system 16 directs the vessel dispenser system 26 to transfer a vessel 66 from a vessel storage unit 84 to a location 86 under the spigot 20. Then, the water control system 16 opens the control valve 64 for a predetermined length of time allowing oxygenated water 46 to fill the vessel 66 by flowing through the spigot 20 into the vessel 66. The user may then remove the filled vessel 66 from the oxygenated water vending system 10 and may drink the oxygenated water 46 from the vessel 66.

As illustrated in FIG. 1, the housing 12 may include a transparent door 88 covering an opening 90 in the housing 12 that allows access to the vessel 66. The transparent door 88 covers or uncovers the opening 90. The movement of the transparent door 88 is controlled by the water control system 16. Normally the transparent door 88 covers the opening 90. The transparent door 88 uncovers the opening 90 after the vessel 66 is filled with oxygenated water 46, allowing the user to remove the vessel 66. Next, the transparent door 88 recovers the opening 90. Additionally, the housing 12 may include a light 92 for illuminating the vessel 66 as the vessel 66 is being filled with oxygenated water 46. The water control system 16 controls turns the light on or off. The housing 12 may include a plurality of legs 94 for contacting a floor surface 96.

FIG. 4 illustrates a front perspective view of a soda dispenser 100. A soda dispenser 100 is typically used to dispense carbonated beverage, ice and or water. The soda dispenser 100 may typically include an ice holder 110, a drip tray 130, an ice dispenser 138, a cup-activated switch 139, a water dispenser 132, a water outlet 133, a cup-activated switch 140, carbonated beverage dispensers 134, 136, carbonated beverage dispensers 135, 137 and cup-activated switches 141, 142.

Figure 5:
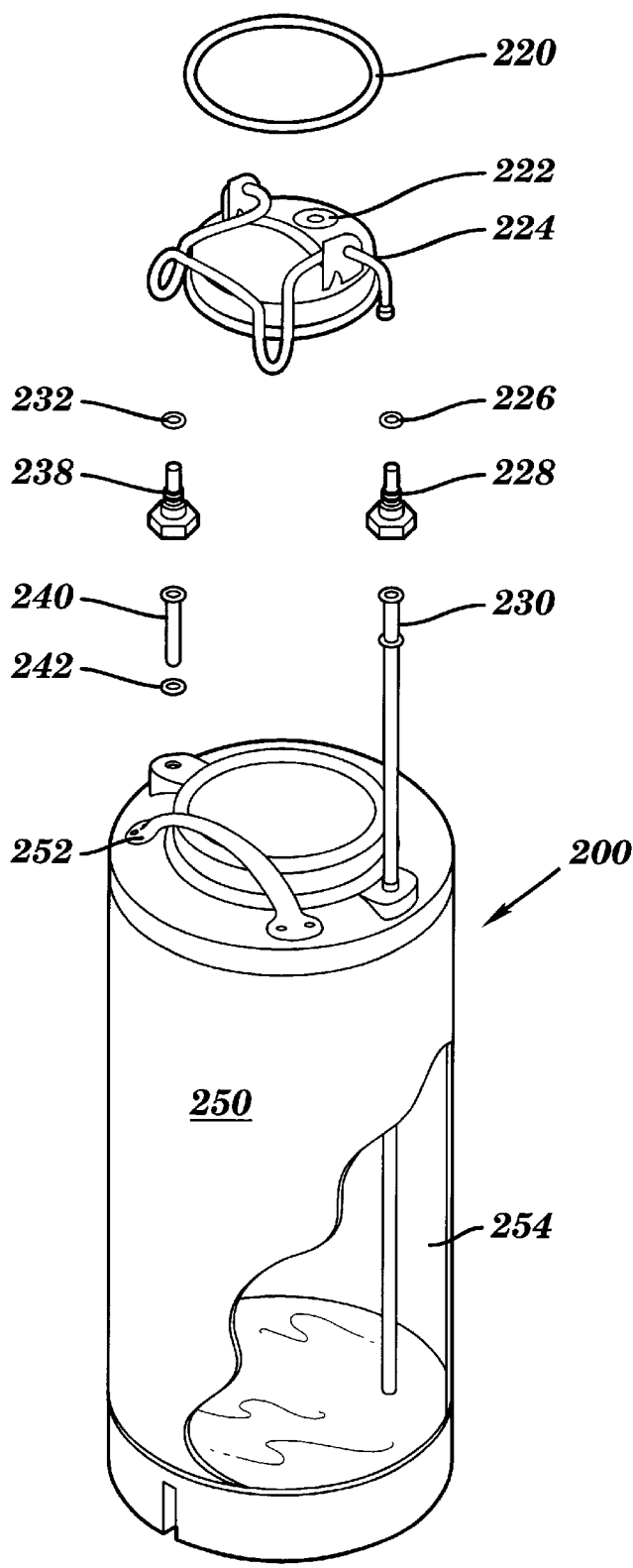
FIG. 5 illustrates an upright container for dispensing oxygenated water.

At least one of many water sources 200, 300, 400 are provided for supplying water to the water dispenser 132. A pressurized container, such as sump container 200 is shown having water 202 and a feed line 210. The pressurized containers 28A–28C may also be sump containers as shown in FIG. 5. FIG. 5 shows an exploded view of a pressurized container 200. The pressurized container 200 has a lid gasket 220, a lid 224, a purge valve 222, an inlet plug 238 for a level tube 240, an outlet plug 228 for a dip tube 230, an external O-ring 226, 232 for the plugs, and associated O-ring 242. The pressurized container 200 includes an internal cavity 254, a handle 252 for transportation, and an exterior 250. The pressurized container 200 is typically made from stainless steel.

Water source 300 is a water cooler type configuration having a bottle 302 and a feed tube 310. The bottle 302 may be nonpressurized or pressurized prior to use.

Water source 400 is a typical residential or commercial plumbing unit having a pipe 402, a faucet 404 or other outlet and an inlet tube 410.

Water is fed from at least one water source 200, 300, 400 into the soda dispenser 100. The water source may be either pressurized with supersaturated oxygen prior to dispensing, or oxygen may be added during dispensing through an oxygen generator 120, pressurized oxygen bottle or the like in a manner similar to the embodiment of FIGS. 1–3.

The foregoing description of the present invention has been presented for purposes of illustration and description. It is not intended to be exhaustive or to limit the invention to the precise form disclosed, and many modifications and variations are possible in light of the above teaching. For example, the pressurized container 28, 200, may be made of any suitable material (e.g., steel, stainless steel, reinforced plastic, glass, etc.). Such modifications and variations that may be apparent to a person skilled in the art are intended to be included within the scope of this invention as defined by the accompanying claims.

We claim:

1. An oxygenated water system comprising:
   at least one water source;
   an oxygenating system operatively attached to said at least one water source, wherein said operative attachment results in oxygenated water; and a soda dispensing system for dispensing said oxygenated water.

2. The oxygenated water system of claim 1, wherein the at least one water source is a pressurized container.

3. The oxygenated water system of claim 2, wherein the pressurized container is a bottle.

4. The oxygenated water system of claim 2, wherein the at least one water source is non-oxygenated water.

5. The oxygenated water system of claim 2, wherein the at least one water source is oxygenated water.

6. The oxygenated water system of claim 1, wherein the at least one water source includes a water pipe.

7. The oxygenated water system of claim 1, wherein the dispensing system includes a payment acceptor system.

8. The oxygenated water system of claim 1, wherein the dispensing system includes a cooling system.

9. The oxygenated water system of claim 1, wherein the dispensing system includes a faucet.

10. An oxygenated water system comprising:
   at least one water source, wherein the at least one water source is a pressurized container, further wherein the pressurized container is a side sump container; and
   a soda dispensing system for dispensing water from the at least one water source wherein water dispensed from the soda dispensing system has dissolved oxygen at a supersaturated level.

11. An oxygenated water system comprising:
   at least one water source, wherein the at least one water source is a pressurized container, further wherein the pressurized container includes a purge valve; and
   a soda dispensing system for dispensing water from the at least one water source wherein water dispensed from the soda dispensing system has dissolved oxygen at a supersaturated level.

12. An oxygenated water system comprising:
   at least one water source;
   an oxygenating system operatively attached to said at least one water source, wherein said operative attachment results in oxygenated water; and
   a soda dispensing system for dispensing said oxygenated water wherein the soda dispensing system dispenses a variety of beverages other than said oxygenated water.

13. The oxygenated water system of claim 12, wherein the other beverages include carbonated beverages.

14. An oxygenated water system comprising:
   at least one water source, wherein the at least one water source is a pressurized container, further wherein the pressurized container is stainless steel; and
   a soda dispensing system for dispensing water from the at least one water source wherein water dispensed from the soda dispensing system has dissolved oxygen at a supersaturated level.

15. An oxygenated water system comprising:
   at least one water source wherein the at least one source of water includes a non-pressurized container;
   an oxygenating system operatively attached to said at least one water source, wherein said operative attachment results in oxygenated water; and
   a soda dispensing system for dispensing said oxygenated water.

16. An oxygenated water system comprising:
   at least one water source;
   a payment acceptor system, operatively attached to said at least one water source;
   an oxygen source operatively attached to said at least one water source; and
   a dispensing system, operatively attached to the payment acceptor system, for dispensing water from the at least one water source, wherein water dispensed from the dispensing system has dissolved oxygen at a supersaturated level.

17. The oxygenated water system of claim 16, wherein the payment acceptor system includes payment selected from the group consisting of a coin, a bill, a token, a credit card, and a debit card.

18. The oxygenated water vending system of claim 16, wherein said oxygen source includes an oxygen generator for supplying pressurized oxygen to the water.

19. The oxygenated water vending system of claim 18, wherein the oxygen generator comprises a pressure swing adsorption apparatus.

20. The oxygenated water vending system of claim 16, wherein said oxygen source includes a pressurized oxygen tank for supplying pressurized oxygen.

21. The oxygenated water vending system of claim 16, further including a vessel dispenser system for automatically supplying a vessel under a spigot of the dispensing system.

22. The oxygenated water vending system of claim 21, wherein the vessel is selected from the group consisting of a cup, a can, and a bottle.

23. The oxygenated water vending system of claim 21, further including a cooling system for cooling the oxygenated water flowing from a pressurized container to the spigot.

24. The oxygenated water vending system of claim 16, further including an overflow drain system for collecting oxygenated water that does not flow from the spigot into a vessel.

25. An oxygenated water vending system comprising:
   at least one water source;
   a payment acceptor system, operatively attached to said water source;
   a dispensing system, operatively attached to the payment acceptor system, for dispensing water from the at least one water source, wherein water dispensed from the dispensing system has dissolved oxygen at a supersaturated level;
   a vessel dispenser system for automatically supplying a vessel under a spigot of the dispensing system; and
   a housing for enclosing each system of the oxygenated water vending system.

26. The oxygenated water vending system of claim 25, wherein the housing further includes a light for illuminating a vessel.

27. The oxygenated water vending system of claim 25, wherein the housing further includes a transparent door for covering or uncovering an opening in the housing.

* * * * *